United States Patent [19]
Hepburn et al.

[11] Patent Number: 5,998,210
[45] Date of Patent: Dec. 7, 1999

[54] METHOD AND APPARATUS FOR AGING A CATALYST

[75] Inventors: Jeffrey Scott Hepburn, Dearborn; Douglas A. Dobson, Plymouth; Robert Joseph Jerger, Livonia, all of Mich.

[73] Assignee: Ford Global Technologies, Inc., Dearborn, Mich.

[21] Appl. No.: 08/942,210

[22] Filed: Oct. 1, 1997

[51] Int. Cl.⁶ .................................................. G01N 31/10
[52] U.S. Cl. ............................ 436/37; 436/147; 60/276; 60/274
[58] Field of Search ........................ 60/274, 276; 436/37, 436/34, 147, 177, 171, 211

[56] References Cited

U.S. PATENT DOCUMENTS

| | | |
|---|---|---|
| 4,691,562 | 9/1987 | Abthoff et al. |
| 4,878,380 | 11/1989 | Goodman . |
| 5,077,970 | 1/1992 | Hamburg . |
| 5,396,794 | 3/1995 | Nichols . |
| 5,433,071 | 7/1995 | Willey et al. ............................... 60/274 |
| 5,545,377 | 8/1996 | Fukaya et al. ........................... 422/108 |
| 5,603,216 | 2/1997 | Guile et al. ............................... 60/288 |
| 5,795,553 | 8/1998 | Lott et al. ............................. 423/213.2 |
| 5,822,979 | 10/1998 | Hamburg et al. .......................... 60/274 |
| 5,869,743 | 2/1999 | Jones et al. ............................ 72/23.31 |

*Primary Examiner*—Frankie L. Stinson
*Attorney, Agent, or Firm*—Jerome R. Drouillard

[57] ABSTRACT

A method and apparatus for aging a catalyst includes selecting an initial catalyst conditioning parameter, such as time and temperature and selecting a kinetic parameter, based on the selected time and temperature parameter, for the catalysis of CO and HC oxidation by the catalyst. A prediction of the vehicle tailpipe emission level, based on the selected kinetic parameter is made. The predicted level is then compared to a target level to determine whether the particular parameters chosen are appropriate to age the catalyst. The catalyst is then aged based on the desired selected parameters.

16 Claims, 3 Drawing Sheets

METHOD AND APPARATUS FOR AGING A CATALYST

FIELD OF THE INVENTION

The present invention relates generally to a method and apparatus for aging a catalyst for automotive vehicle emission systems and more particular to a method and apparatus for predicting an appropriate catalyst aging for emission system calibration.

BACKGROUND OF THE INVENTION

Beginning with the 1994 model year, automotive manufacturers began the implementation of systems designed to diagnose malfunctioning emission related components on-board the vehicle. The set of regulations requiring these on-board diagnostic capabilities is commonly referred to as either OBD-II (On-Board Diagnostics-II for California) or OBD (On-Board Diagnostics for the remaining 49 states). One component which the on-board diagnostics system must diagnose is the catalytic converter. The Federal OBD regulations for catalytic converter efficiency monitoring require that the Malfunction Indicator Light (MIL) be illuminated when catalyst performance degrades to a level such that the Federal Test Procedure (FTP) tailpipe HC emissions increase by more that 0.40 gm/mi relative to the baseline emission level or before tailpipe HC emissions exceed 0.60 gm/mi. The California requirements for low emission vehicles (i.e. TLEVs, LEVs, and ULEVs) specify that catalyst malfunction is to be determined when either of the following occurs: 1) tailpipe HC emissions exceed 1.75 times the applicable non-methane organic matter (NMOG) standard, or 2) non-methane hydrocarbons (NMHC) conversion efficiency of the monitored portion of the catalyst system falls below the 50% level.

Over the past 5–6 years, the automotive industry has deployed significant resources toward the development and implementation of the various monitors associated with OBD (Federal) and OBD-II (California). In addition to these large investments, every automotive manufacturer must continue to provide for considerable expenditures in engineering and testing resources for the calibration of the various monitors for each of their particular vehicle engine families. For example, any modification to the base engine hardware, engine operating strategy, or engine calibration effecting emissions would generally necessitate recalibration of the catalyst monitor for a given vehicle. Also, changes to the exhaust system configuration, catalyst placement, or catalyst washcoat formulation require that the monitor be recalibrated. In most cases, last minute changes or running changes to the base engine hardware or calibration along with the exhaust and catalyst system are generally precluded due to the prohibitive resource requirements associated with recalibration of the effected OBD monitors.

Calibration of the catalyst monitor requires the use of a threshold converter or catalyst hardware. As used herein, the terms "converter" and "catalyst" are used interchangeably. A threshold converter or catalyst is one whose performance or activity is degraded to a point which causes FTP HC tailpipe emissions to be equal or very close to the level where the MIL is to be activated.

The inventors of the present invention have found that the availability of threshold converters or catalysts to support catalyst monitor calibration has been a problem. The use of field aged converters to satisfy the need for the threshold hardware is not feasible due to the scarcity of in-use converters with threshold efficiency levels because a threshold converter is intended to represent a catastrophic failure which is expected to occur on only a very small fraction of the vehicle population. Additionally, catalyst washcoat technology has evolved at a considerable pace in recent years. The earlier generations of catalyst technology which are currently in service are significantly different compared to the catalyst technology which most manufacturers are planning to use in the very near future and are therefore inappropriate for catalyst monitor calibration purposes.

To simulate a field aged catalyst, prior methods include placing a catalyst on engine dynamometers and inducing various levels of misfire in order to degrade catalyst performance to the required threshold level. The inventors of the present invention have found various disadvantages with this approach. For example, under steady state conditions, it is difficult to achieve the necessary midbed temperatures to degrade the catalyst to the desired efficiency level within a reasonable time. Also, considerations about the availability of engine dynamometers and other resources required to meet the demand for threshold catalyst hardware with the misfire method may be limited.

The preferred method of producing threshold catalysts is oven aging. Here, the catalyst bricks are removed from the converter shell assembly and baked in an oven at temperatures ranging between 1000 and 1350° C. and times from 2 to 32 hours. After aging, the bricks are recanned and installed onto the vehicle. The vehicle is then usually driven for a few hundred miles to provide for a stabilization or break-in period prior to emission testing. One drawback associated with this method is the difficulty associated with determining the appropriate aging time and temperature required to degrade the catalyst performance to a specified level for a given vehicle. As a result, several iterations are often necessary in order to obtain the desired catalyst performance level. Once the emission results are obtained for one given aging, either the aging time or temperature is accordingly adjusted in order to move the tailpipe emissions closer to the desired threshold level. Generally, anywhere from 2 to 5 iterations can be required in order to obtain a threshold catalyst system. This type of trial and error procedure results in significant time delays and inefficiencies in the OBD calibration process. In addition, the need to place the catalyst on a vehicle for a predetermined drive cycle to stabilize the activity of the catalyst further increases the time and resource requirements for calibration of the monitor.

SUMMARY OF THE INVENTION

Accordingly, an object of the present invention is to provide an accurate and time efficient means of specifying the correct oven aging condition for a catalyst system of a given vehicle. This object is achieved, and disadvantages of prior art approaches are overcome by providing a novel method of conditioning a catalyst. In one particular aspect of the invention, the method includes the steps of selecting an initial catalyst aging conditioning parameter, such as time and temperature, and selecting a corresponding kinetic parameter, based on the selected time and temperature, for the catalytic oxidation of CO and HC. The method further includes the step of predicting the vehicle tailpipe emissions, based on the selected kinetic parameter. The predicted emissions is then compared to a target level to determine whether the particular conditioning parameter selected is appropriate to age the catalyst.

In another aspect of the invention, the method includes the step of stabilizing the conditioned catalyst. More specifically, the conditioned catalyst is further conditioned based on a predetermined conditioning parameter and reacted with a reactant.

An advantage of the present invention is that a precise and cost-effective method of aging an OBD threshold catalyst is provided.

Another, more specific, advantage of the present invention is that the trial and error process associated with prior art oven aging methods may be reduced.

Still another advantage of the present invention is that the need to place the threshold catalyst on a vehicle for a predetermined drive cycle may be eliminated.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
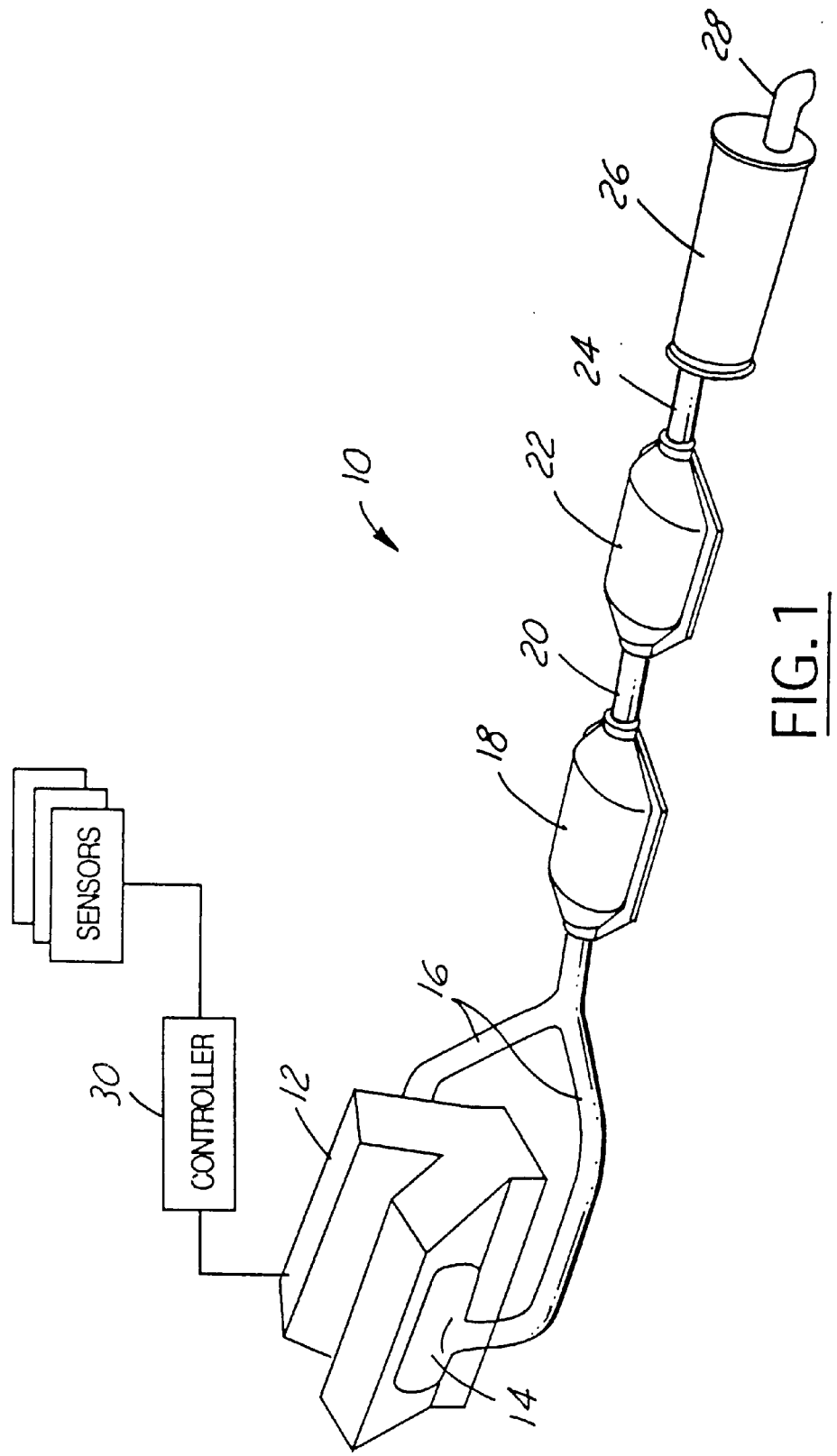
FIG. 1 is a diagrammatic representation of an automotive vehicle exhaust system.

Exhaust system 10 of an automotive vehicle, shown in FIG. 1, is coupled to V-engine 12. System 10 includes exhaust manifolds 14 coupled to engine 12 and first exhaust pipe 16 coupled to manifold 14. For the sake of clarity, a single exhaust system 10 is shown for the V-engine 12. Catalyst 18 is coupled to first exhaust pipe 16 and second exhaust pipe 20. A second catalyst 22, if desired, is coupled to second exhaust pipe 20 and third exhaust pipe 24. Muffler 26 is coupled to third exhaust pipe 24 and tail pipe 28 is coupled to muffler 26. System 10 shown in FIG. 1 is exemplary. Accordingly, numerous exhaust system configurations may be utilized.

Figure 2:
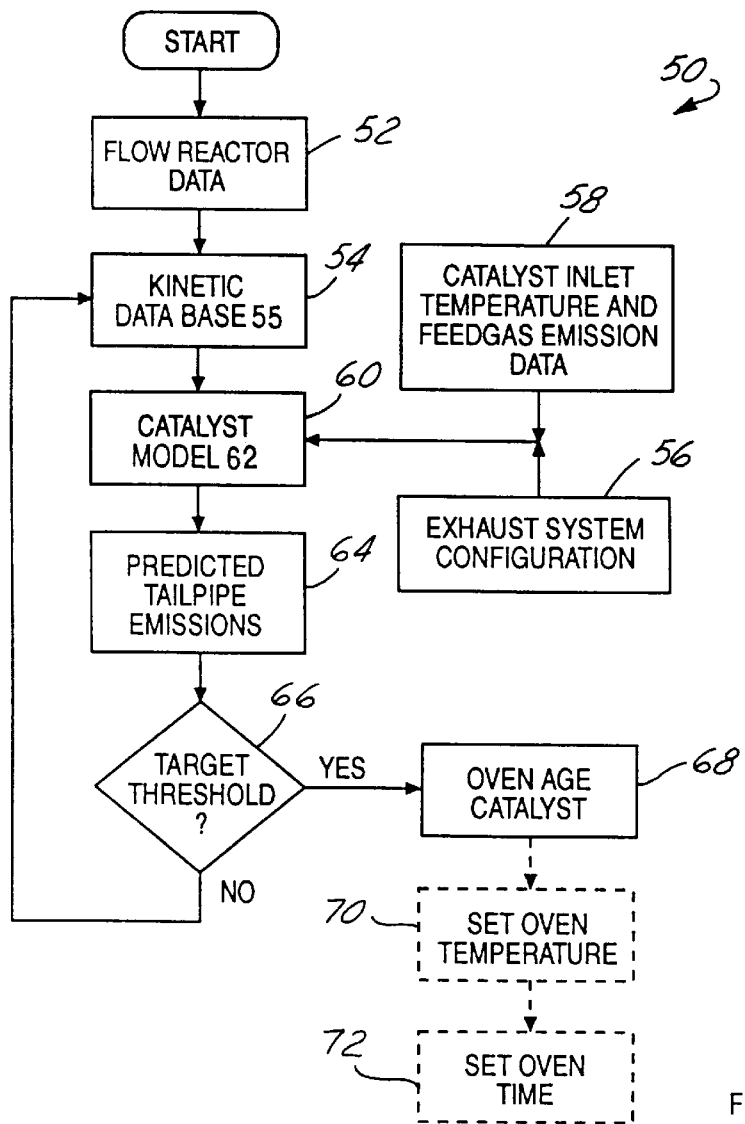
FIG. 2 is a flow chart of a catalyst oven aging process according to the present invention.

According to the present invention, catalyst aging prediction process 50, shown in the flow diagram of FIG. 2 is used to predict or obtain a desired catalyst time and temperature requirement for oven aging a catalyst so that the catalyst may be used to calibrate the on-board diagnostics performed by engine controller 30 (See FIG. 1). At steps 52 and 54, a set of kinetic parameters for the oxidation of hydrocarbons (HC) and carbon monoxide (CO) are selected for a given selected oven aging time and temperature. Here, it is assumed that the catalyst formulation is specified since the kinetic parameters for a given selected oven aging time and temperature are highly dependent upon the catalyst washcoat technology. This information is derived and stored in kinetic data base 55.

Information about the vehicle's catalyst system, such as the brick configuration as well as the individual catalyst brick volumes and frontal areas are input into process 50 as shown at step 56. Actual vehicle feedgas parameters or engine out emissions parameters for an FTP test are also input into process 50 at step 58. Typical parameters include, but are not limited to, are the feedgas concentrations of HC, CO; the A/F of the exhaust gas; the exhaust gas inlet temperature to the front catalyst brick; and, the volumetric flow rate of exhaust as a function of time.

With this information, according to the present invention, at step 60, catalyst model 62 is then used to project or predict the FTP HC tailpipe emissions corresponding to the oven aging time and temperature used in steps 52 and 54. This prediction is then output at step 64. At step 66, the predicted tailpipe emissions resulting from the predicted oven aging output at step 64 is compared to the desired threshold emission level. If the predicted tailpipe emissions are relatively close to the threshold value (i.e. within roughly 10%, for example), then, at step 68, process 50 enters an oven age routine where the specified time and temperature derived by process 50 is output so that a user may program an oven containing a catalyst to be aged. Alternatively, as will be further described with reference to FIG. 3, the specified time and temperature may be output directly to the oven, where, at step 70, the desired oven temperature is set and at step 72, the desired time is set. However, if at step 66, agreement between the predicted tailpipe emissions and the desired threshold is poor, the process loops back to step 54 where kinetic constants corresponding to a different oven aging time and temperature are judiciously chosen and a second iteration is carried out. This sequence is carried out until a good agreement is achieved between the tailpipe emissions which are projected by the model and the desired threshold emission level.

Figure 3:
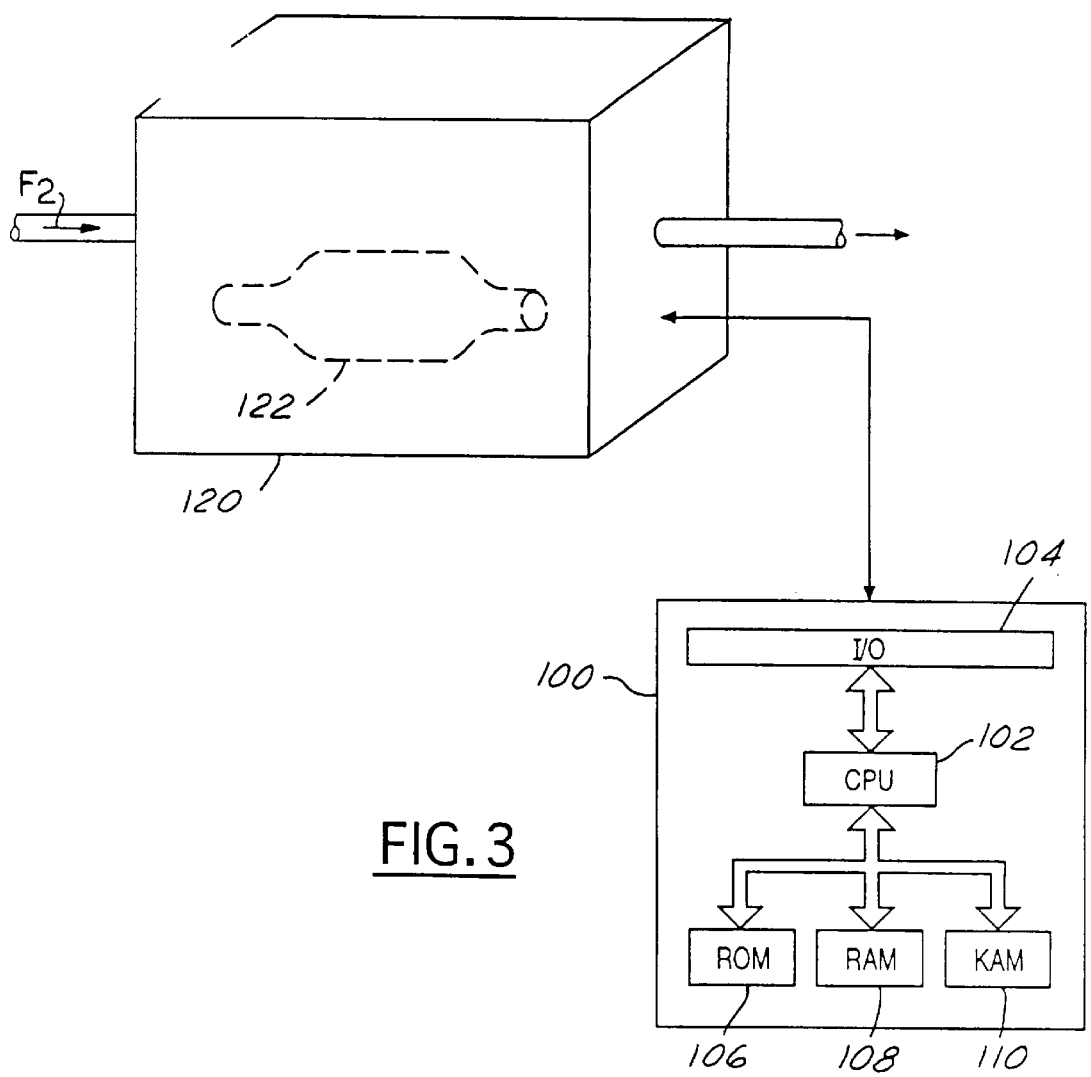
FIG. 3 is a diagrammatic representation of an oven aging apparatus according to the present invention.

In a preferred embodiment, as best shown in FIG. 3, computer 100, having microprocessor unit 102, input/output ports 104, electronic storage medium for storing executable programs, shown as "Read Only Memory" (ROM) chip 106, in this particular example, "Random Access Memory" (RAM) 108, "Keep Alive Memory" (KAM) 110 and a conventional data bus, is charged with the task of performing process 50 and, in an alternative embodiment, may be used to control oven 120. In particular, computer 100 executes process 50 and signals oven 120 to age catalyst 122 placed therein for the determined predicted time and temperature.

According to the present invention, catalyst model 62 is described by the following set of partial differential equations. One dimensional energy balances carried out on the gas and solid phases of the monolithic catalyst substrate provide the following:

$$\varepsilon \cdot \rho_{ex} \cdot c_{pex} \cdot \frac{\partial T_{ex}}{\partial t} = -\upsilon \cdot \rho_{ex} \cdot c_{pex} \cdot \frac{\partial T_{ex}}{\partial x} - h_a \cdot gsa \cdot (T_{ex} - T_{sub}) \quad (1)$$

where, $\varepsilon$=catalyst void fraction;

$\rho_{ex}$=density of exhaust gas;

$c_{pex}$=heat capacity of exhaust gas;

$T_{ex}$=exhaust gas temperature;

$\upsilon$=superficial velocity of exhaust gas;

$h_a$=heat transfer coefficient;

gsa =geometric surface area of substrate; and $T_{sub}$=substrate temperature.

$$(1-\varepsilon) \cdot \rho_{sub} \cdot c_{p_{sub}} \cdot \frac{\partial T_{sub}}{\partial t} = \quad (2)$$

-continued $$(1-\varepsilon) \cdot k_{sub} \cdot \frac{\partial^2 T_{ex}}{\partial x^2} + h_a \cdot gsa \cdot (T_{ex} - T_{sub}) +$$

$$\rho_{cat} \cdot (R_{rxn}^{co} \cdot \Delta H_{rxn}^{co} + R_{rxn}^{hc} \cdot \Delta H_{rxn}^{hc}) + \frac{2.0}{R_{cat}} \cdot h_o \cdot (T_{sub} - T_a) \quad 5$$

where, $\rho_{sub}$=density of substrate material;
$c_{psub}$=heat capacity of substrate material;
$k_{sub}$=thermal conductivity of substrate material;
$\rho_{cat}$=catalyst washcoat loading;
$R^i_{rxn}$=rate of reaction for i;
$\Delta H^{irxn}$=heat of reaction for i;
$R_{cat}$=radius of catalyst substrate; and,
$h_o$=external heat transfer coefficient.

Here, gas phase thermal conductivity is ignored. It is assumed that the temperature of the catalyst substrate is uniform in the direction perpendicular to the flow and that the heat loss to the outside environment is governed by an overall heat transfer coefficient, $h_o$. Also, the flow distribution across the front face of the catalyst is presumed to be uniform. Additionally, Equations 1 and 2 are governed by the following boundary conditions:

$$T_{ex}(x=0,t)=T_{inlet}(t) \quad (3)$$

where, $T_{inlet}$=inlet gas temperature.

$$T_{ex}(x, t = 0) = 20° C. \quad (4)$$

$$T_{sub}(x, t = 0) = 20° C. \quad (5)$$

$$\left.\frac{\partial T_{sub}}{\partial x}\right|_{x=0,t} = 0 \quad (6)$$

$$\left.\frac{\partial T_{sub}}{\partial x}\right|_{x=1,t} = 0 \quad (7)$$

Similarly, mass balances are carried out for the various constituents in the bulk gas and catalyst washcoat phases:

$$\varepsilon \cdot \frac{\partial c^i_{ex}}{\partial t} = -v \cdot \frac{\partial c^i_{ex}}{\partial t} - k_m \cdot gsa \cdot (c^i_{ex} - c^i_{sub}) \quad (8)$$

where, $c^i_{ex}$=concentration of i in the exhaust gas;
$k_m$=mass transfer coefficient; and,
$c^i_{sub}$=concentration of i in the substrate.

$$(1-\varepsilon) \cdot \frac{\partial c^i_{sub}}{\partial t} = k_m \cdot gsa \cdot (c^i_{ex} - c^i_{sub}) - \rho_{cat} \cdot R^i_{rxn} \quad (9)$$

Equations 8 and 9 are governed by the following boundary conditions:

$$C_{ex}^i(x,t=0)=0 \quad (10)$$

$$C_{ex}^i(x=0,t)=c_{inlet}^i(t) \quad (11)$$

where, $c^i_{inlet}$=gas concentration.

$$c_{sub}^i(x,t=0)=0 \quad (12)$$

In this analysis, gas phase diffusion is not taken into consideration. The catalytic reaction rates are approximated by the following kinetic expressions:

$$R_{rxn}^{CO} = k_o^{CO} \cdot e^{\left(\frac{-E_a^{CO}}{R \cdot T_{sub}}\right)} \cdot c_{sub}^{CO} \cdot c_{sub}^{O_2} \quad (13)$$

where, $k_o^i$=pre-exponential constant for i.

$$R_{rxn}^{H_2} = k_o^{H_2} \cdot e^{\left(\frac{-E_a^{H_2}}{R \cdot T_{sub}}\right)} \cdot c_{sub}^{H_2} \cdot c_{sub}^{O_2} \quad (14)$$

where, $E_a^i$ activation energy for i.

$$R_{rxn}^{HC} = k_o^{HC} \cdot e^{\left(\frac{-E_a^{HC}}{R \cdot T_{sub}}\right)} \cdot c_{sub}^{HC} \cdot c_{sub}^{O_2} \quad (15)$$

The kinetic parameters, $k_o^i$ and $E_a^i$, are a function of the catalyst washcoat formulation and oven aging recipe and are contained within the kinetic data base which will be described in more detail hereinafter. Only one hydrocarbon species is considered. The various $NO_x$ reactions with HC, CO, and $H_2$ are also not taken into account. Also, it is assumed that the $H_2$ concentration in the exhaust is approximately equal to ⅓ of the CO concentration:

$$c_{inlet}^{H_2}=\frac{1}{3} \cdot c_{inlet}^{co} \quad (16)$$

In addition, the kinetics for CO and $H_2$ oxidation are presumed to be equal:

$$k_o^{H_2}=k_o^{co} \text{ and } E_a^{H_2}=E_a^{co} \quad (17)$$

For multi-brick catalyst systems where the catalyst bricks are arranged in series and packaged within separate cans, a forced convective heat transfer model for flow within a pipe is used to predict the temperature drop in the exhaust gas as it passes from the outlet of one brick to the inlet of another:

$$\rho_{ex} \cdot c_{p_{ex}} \cdot \frac{\partial T_{ex}}{\partial t} = -v_p \cdot \rho_{ex} \cdot c_{p_{ex}} \cdot \frac{\partial T_{ex}}{\partial x_p} - h_{ip} \cdot 2 \cdot \pi \cdot R_p \cdot (T_{ex} - T_w) \quad (18)$$

where, $h_{ip}$=internal heat transfer coefficient for the pipe; and,
$v_p$=exhaust gas velocity in the pipe.

$$\delta w \cdot 2 \cdot \pi \cdot R_p \cdot c_{p_w} \cdot \rho_w \cdot \frac{\partial T_w}{\partial t} = k_w \cdot \frac{\partial^2 T_w}{\partial x_p^2} - h_{op} \cdot 2 \cdot \pi \cdot R_p \cdot (T_w - T_a) \quad (19)$$

where, $h_{op}$=internal heat transfer coefficient for the pipe;
$R_p$=pipe radius;
$T_w$=wall temperature of the pipe;
$C_{pw}$=heat capacity of the pipe wall;
$\rho_w$=density of the pipe wall;
$\delta_w$=thickness of the pipe wall;
$k_w$=thermal conductivity of pipe wall; and,
$T_a$=ambient temperature.

The boundary conditions for these equations are as follows:

$$T_{ex}(x_p, t = 0) = 20° C. \tag{20}$$

$$T_{ex}(x_p = 0, t) = T_{ex}(x = 1, t) \tag{21}$$

$$T_w(x_p, t = 0) = 20° C. \tag{22}$$

$$\left.\frac{\partial T_w}{\partial x}\right|_{x_p=0} = 0 \tag{23}$$

$$\left.\frac{\partial T_w}{\partial x}\right|_{x_p=l_p} = 0 \tag{24}$$

where, x=distance along the catalyst substrate; and, $x_p$=distance along the pipe.

Once again, gas phase thermal conduction is ignored, and the temperature distribution through the pipe wall is assumed to be uniform.

The above sets of partial differential equations are integrated numerically using finite difference approximations for the partial derivatives in the x-dimension through the method of lines. An ordinary differential equation integration package for stiff systems, such as the Livermore Solver for ordinary Differential Equations (LSODE) is then used to integrate with respect to time. Values for the various physical constants which are contained within the above equations are readily determined by those of ordinary skill in the art.

Figure 4:
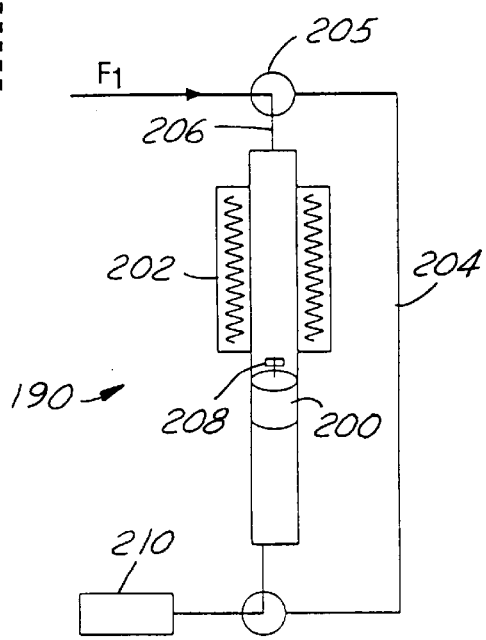
FIG. 4 is a diagrammatic representation of a test oven according to the present invention; and, FIG. 5 is a flow chart of a stabilizing process for stabilizing an oven aged catalyst according to the present invention.

Further, according to the present invention, the kinetic constants (for use in the kinetic data base) corresponding to the various oven aging conditioning parameters (i.e. time and temperature) were determined from transient light-off experiments. The transient light-off tests were carried out in laboratory flow reactor 190 schematically shown in FIG. 4. For these experiments, a catalyst sample 200 (0.75" dia×1.0" length) is positioned below a heated zone of tube furnace 202. Catalyst sample 200 is initially approximately room temperature. Synthetic exhaust gas, shown as arrow $F_1$ bypasses catalyst sample 200 through flow tube 204 at a flow rate of about 3 liters/min. For the determination of the CO oxidation kinetics, the synthetic exhaust gas is composed of 1.5% CO, 0.5% $H_2$, 1000 ppm $NO_x$, 10% $CO_2$, 10% $H_2O$, a stoichiometric amount of $O_2$, and a balance of $N_2$. In order to determine the HC oxidation kinetics, the CO and $H_2$ in the above mixture is replaced with 1500 ppm propylene ($C_3H_6$), and the $O_2$ concentration is adjusted to the appropriate stoichiometric level. At time equal to zero, solenoid valve 205 is operated such that the synthetic exhaust gas mixture is made to flow through tube 206 and into furnace 202 and catalyst sample 200. The corresponding catalyst inlet temperature profile is recorded by thermocouple 208, and the conversion efficiencies of either CO or HC are measured as a function of time with exhaust gas analyzers 210. Generally, catalyst sample 200 is conditioned in the synthetic exhaust gas at a temperature of 600° C. for a period of approximately 1 hour in order to stabilize the catalyst surface prior to carrying out the transient light-off tests.

Because the CO and HC oxidation kinetics are each described by two kinetic parameters (see Equations 13–15), the data from two transient light-off experiments (i.e. corresponding to two different catalyst inlet temperature profiles) are required in order to determine both $K_o^i$ and $E_a^i$. The inlet temperature profile to the catalyst is determined by the furnace temperature. In order to increase the accuracy in the determination of $k_o^i$ and $E_a^i$, the catalyst inlet temperature profiles are adjusted so as maximize the difference in the light-off times between the two experiments. Determination of $k_o^i$ and $E_a^i$ involves the use of transient catalyst model 62 described earlier with reference to Equations 1–17. The appropriate parameters associated with the transient light-off test such as the flow rate, catalyst size, inlet gas concentrations, and inlet temperature profile are taken into account within model 62. $k_o^i$ and $E_a^i$ are determined by fitting results of model 62 to the experimental data. This process is summarized as follows for a set of transient light-off results corresponding to a high temperature profile (HTP) and low temperature profile (LPT) experiment. First, starting with the LTP run, $k_o^i$ is adjusted in order to achieve the best agreement between the experimental data and the model prediction while $E_a^i$ is held constant. Second, using the same $E_a^i$ along with the value just determined for $k_o^i$, the experimental data and the model prediction for the HTP run are compared. If the absolute error is positive (i.e. implying that the light-off which is predicted by the model is slower than the experimental data), $E_a^i$ is increased. On the other hand, if the absolute error is negative, $E_a^i$ is decreased. With a new value for $E_a^i$, the process repeats.

Iteration continues until an acceptable level of error is achieved between the model predictions and the experimental data. The experimental data can be fit reasonably well for any given $E_a^i$ by simply adjusting $k_o^i$. However, only one combination of $k_o^i$ and $E_a^i$ provides for a relatively good agreement with the experimental data from the HTP run.

Figure 5:
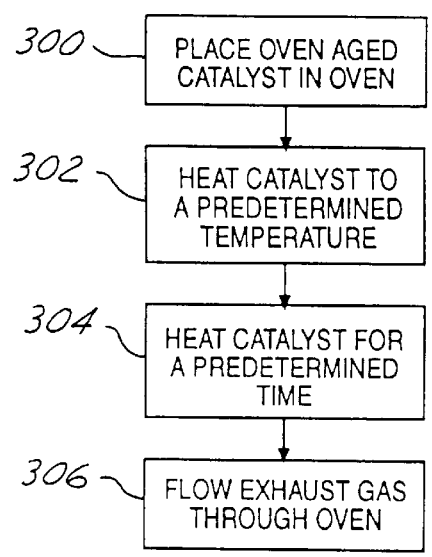

Referring now to FIGS. 3 and 5, a method of stabilizing the activity of a catalyst aged according to the previously described process is shown. At step 300, the oven aged catalyst is placed in oven 120. Alternatively a controlled environment retort chamber known to those skilled in the art may be used. The oven is then heated, at step 302, to a predetermined temperature, preferably to about 600° C. The catalyst 122 remains in oven 120 for a predetermined time period, preferably for about 12 hours, as shown at step 304. Stoichiometric exhaust gas $F_2$ flows continuously though oven 120, as shown at step 306. The stoichiometric exhaust gas may be produced by a small internal combustion engine, a laboratory pulse flame combustor or burner, or a synthetic blend consisting of a mixture containing $H_2O$, $CO_2$, CO, HC and $O_2$ in nitrogen. Other methods for producing a stoichiometric exhaust gas known to those skilled in the art may be used.

While the best mode for carrying out the invention has been described in detail, those skilled in the art in which this invention relates will recognize various alternative designs and embodiments, including those mentioned above, in practicing the invention that has been defined by the following claims.

We claim:

1. A method of conditioning a catalyst comprising the steps of:

selecting an initial catalyst conditioning parameter;

selecting a corresponding kinetic parameter, based on said selected catalyst conditioning parameter, for the catalysis of feedgas to be catalyzed by the catalyst;

predicting, based on said selected kinetic parameter, an emission level of gas flowing from the catalyst, thereby obtaining a predicted level;

comparing said predicted level to a target level; and, determining whether said selected initial catalyst conditioning parameter is sufficient to condition the catalyst.

2. A method according to claim 1 further comprising the step of:

selecting a new catalyst conditioning parameter;

selecting a new corresponding kinetic parameter, based on said selected new catalyst conditioning parameter;

predicting, based on said selected new corresponding kinetic parameter, an emission level of gas flowing from the catalyst, thereby obtaining a new predicted level;

comparing said new predicted level to said target level; and, determining whether said selected new catalyst conditioning parameter is sufficient to condition the catalyst.

3. A method according to claim 1 wherein said predicting step comprises the step of determining physical characteristics of the catalyst to be conditioned.

4. A method according to claim 1 wherein said predicting step further comprises the step of selecting a feedgas parameter of the feedgas to be catalyzed by the catalyst.

5. A method according to claim 1 further comprising the step of conditioning the catalyst based on said selected catalyst conditioning parameter.

6. A method according to claim 5 wherein said conditioning step commences when said predicted level is approximately within 10% of said target level.

7. A method according to claim 5 further comprising the step of stabilizing the conditioned catalyst.

8. A method according to claim 7 wherein said stabilizing step comprises the steps of:

conditioning the catalyst based on a predetermined conditioning parameter; and, reacting the catalyst with a reactant.

9. A method according to claim 8 wherein said reacting step comprises the step of reacting the catalyst with stoichiometric air-fuel mixture.

10. A method of aging a vehicle catalyst comprising the steps of:

a) selecting an aging time and temperature to age the catalyst;

b) selecting a kinetic parameter, based on said aging time and temperature, for the oxidation of a exhaust gas to be catalyzed by the catalyst;

c) predicting, based on said selected kinetic parameter, a vehicle emission level;

d) comparing said predicted emission level to a target emission level; and, e) repeating steps a) through d) until said predicted level is within a predetermined range relative to said target level; and, f) oven aging the catalyst, based on said selected time and temperature, in an oven when said predicted level is within said predetermined range.

11. A method according to claim 10 wherein said predicting step further comprises the step of selecting an exhaust gas parameter of the exhaust gas to be catalyzed by the catalyst.

12. A method according to claim 11 wherein said exhaust gas parameter comprises at least one of the concentration of hydrocarbons and carbon monoxide in the exhaust gas, exhaust gas temperature, and flow rate of exhaust gas.

13. A method according to claim 10 further comprising the steps of:

oven aging the catalyst in an oven at a predetermined temperature and a predetermined time period; and, flowing exhaust gas through the oven so that the exhaust gas reacts with the catalyst.

14. A method according to claim 13 wherein said predetermined temperature is about 600° C.

15. A method according to claim 13 wherein said predetermined time period is about 12 hours.

16. A method according to claim 13 wherein said exhaust gas contains a stoichiometric air-fuel mixture.

\* \* \* \* \*